Nov. 20, 1934.   R. J. SMITH ET AL   1,981,757

HYDRAULIC PUMP AND MOTOR OF HYDRAULIC TRANSMISSION GEAR

Filed Aug. 25, 1933

R. J. Smith
C. A. Newton
R. C. Roe
Glascock, Downing & Seebold
ATTORNEYS.

Patented Nov. 20, 1934

1,981,757

UNITED STATES PATENT OFFICE 1,981,757

HYDRAULIC PUMP AND MOTOR OF HYDRAULIC TRANSMISSION GEAR

Ralph John Smith and Charles Andrew Newton, Littleover, and Reginald Claude Roe, Rochdale, England Application August 25, 1933, Serial No. 686,842
In Great Britain July 11, 1932

9 Claims. (Cl. 103—174)

This invention relates to hydraulic transmission gear of the type described and claimed in the specification of our prior Patent No. 1,914,622 in which rollers are constrained to remain in contact with an excentric ring, such rollers being located in radial pockets in a casing concentric with the axis of rotation of the excentric ring, fluid distribution means being provided for the spaces or divisions between the excentric ring and the casing and for the pockets in which the rollers reciprocate.

The object of our present invention is to provide certain improvements in the said type of gear arising out of the practical development of the same.

The invention comprises the provision of means permitting an interchange of fluid between the pockets and the spaces of divisions between the rollers and around the excentrically disposed surface upon which the rollers ride, at the ends of the roller strokes when excessive pressure may occur in the pockets or spaces.

The invention further comprises the provision of slots or recesses in the walls of each pocket of the pump unit at the opposite sides of the roller, such slots or recesses being located to include the line of contact of roller and wall at the ends of the outer and inner strokes of the roller in its pocket so as to permit a momentary interchange of displacement between each pocket and the space or division between pairs of rollers around the excentric ring upon which the rollers ride.

The invention further comprises the provision of means in the valve ring of the motor unit of by-pass recesses for interconnecting in pairs the ports leading to the pockets and to the spaces or divisions around the excentric upon which the rollers ride, and of means for preventing the valve ring from revolving about its axis.

The invention further comprises the provision of crank arms for carrying the valve ring and preventing its revolving about its axis.

Referring to the accompanying sheet of explanatory drawing.

Figure 1:
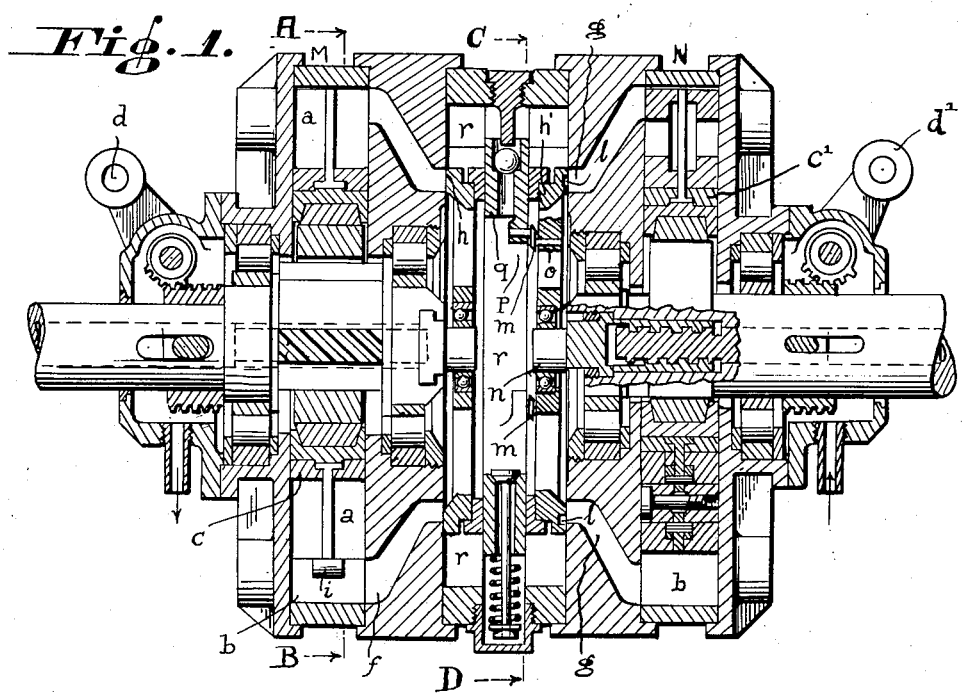
Figure 1 is a longitudinal sectional elevation through the hydraulic gear.
Figure 2:
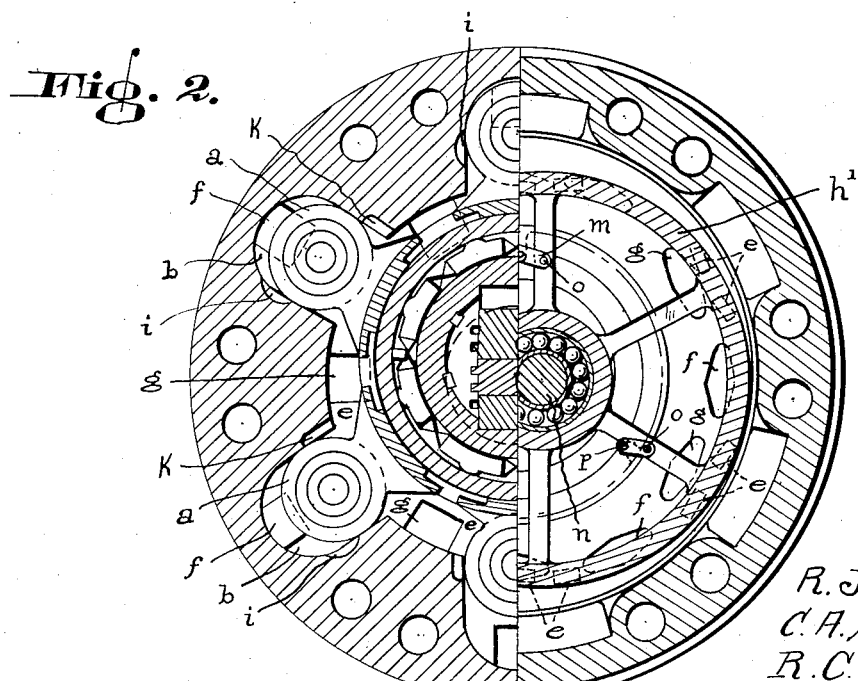
Figure 2 is a cross-sectional elevation, one half upon the line A—B of Figure 1 and one half upon the line C—D of Figure 1.

The drawing shows one convenient form of hydraulic gear in accordance with our invention. In its general constructional features and mode of operation this gear is precisely similar to that described in our prior United States Patent 1,914,622 and therefore we will not describe the whole gear in detail but only so much thereof as is necessary for the understanding of the present invention.

The complete gear comprises a pump unit which pumps a hydraulic fluid and a motor unit driven by said fluid. These units are indicated generally at M and N and except as is stated later are identical one with another. For convenience the description will refer to the pump unit M.

The pumping is carried out by a number (in this case six) of rollers $a$ reciprocating in radial pockets $b$ in a stationary casing. These rollers are constrained to remain in contact with an excentrically moving ring $c$ whose axis of rotation is concentric with the casing and the excentricity of movement of this ring can be varied by the control lever $d$.

Hydraulic fluid fills both the radial pockets $b$ and the spaces $e$ between the rollers, the casing and the excentric ring, and is periodically forced from each such pocket or space by the movement of the ring and its associated rollers. The fluid passes by ports $f$ and $g$ from the pockets and the said spaces respectively, and these ports are periodically covered and uncovered by an excentrically moving valve ring $h$. This valve ring $h$ is of fixed eccentricity, but in the motor unit N the corresponding valve ring $h'$ is of variable excentricity (to permit of the reversing of the unit) being controlled by lever $d'$, and the roller-bearing ring $c'$ is of fixed excentricity.

The central space $r$ between the pump and motor units is always filled with fluid under pressure. The fluid is returned from the motor to the pump unit via an external oil storage tank, not shown.

According to the present invention we provide for a momentary flow of fluid at the end of a roller stroke from one side of a roller to the other. Thus just when the maximum fluid pressure is built up a slight momentary flow is permitted to a chamber containing fluid at a lower pressure at the other side of the same roller. By this means we obtain a cushioning effect, produce easier running and obviate the setting up of dangerous stresses in the mechanism.

We provide slots or recesses in the walls of the pockets $b$ at the opposite sides of the roller $a$ in each pocket. the slots or recesses $i$ being located to correspond with the top or outer position of the roller $a$ and the other slots or recesses $k$ being in a position to correspond with the bottom or inner position of the roller. Such slots or recesses permit of a momentary interchange of displacement between each pocket $b$ and the space or division between the excentric ring $c$ and the casing which works in conjunction with such pocket to form one section of the pump, so that when at the time of cut-off by the valve ring $h$ of fluid from or to a pocket and space or division, any slight change of volume in the pocket and space or division results in a flow of fluid from one to the other, for one is approaching the end of a stroke whilst the other is commencing the next stroke. Trapping of fluid in the pockets and spaces or divisions as they complete a stroke and commence the next stroke is thereby obviated. This arrangement is applicable to the pump end only of the transmission gear, for it is not reversible.

For the reversible end of the gear which is the motor or engine end we provide for a similar momentary interconnection of the pockets and spaces in pairs by providing by-pass recesses $l$ in the face of the valve ring $h'$, such recesses connecting the pairs of ports $f$ and $g$ which the valve ring moves, at the appropriate periods. There are two sets of such recesses $l$ in the valve ring, one for forward and the other for reverse running. They cause a balancing or equalizing action between a pocket as $b$, and a space $e$ which would otherwise be closed by the valve ring and have the fluid therein trapped. With this arrangement it is necessary to prevent the valve ring $h'$ revolving about its own axis in order that the recesses may always be correctly positioned with relation to the ports which the valve ring controls. One convenient method of ensuring this is to provide three or more cranks $m$ of a throw corresponding with the throw of the crank $n$ which reverses the valve ring and equally spaced apart. Each of these crank arms $n$ is pivoted at one end to one of the radial arms $o$ upon which the valve ring is carried and at the other end is pivoted to a projection $p$ upon a stationary ring $q$ secured to the outer casing.

It will be appreciated that structural modifications within the scope of the appended claims may be made in the mechanism above described without departing from the invention.

What we claim is:

1. In hydraulic transmission gear of the type specified in which rollers are constrained to remain in contact with an excentric ring and to reciprocate in radial pockets in a casing concentric with the axis of rotation of the excentric ring, fluid distribution ports leading from each of said pockets and from the spaces or divisions between said rollers, said excentric ring and said casing, together with a valve ring, adapted to open and close said ports, the provision of throughway apertures connecting each of said pockets to one of said spaces, at the further side of the particular roller reciprocating in said pocket, said apertures being arranged to be opened momentarily at the ends of the roller strokes and to be closed during the remainder of said strokes.

2. In hydraulic transmission gear of the type specified and as claimed in claim 1, the provision in the valve ring of the motor unit of by-pass recesses for interconnecting in pairs the ports leading to the pockets and to the spaces or divisions around the excentric upon which the rollers ride, and of means for preventing the valve ring from revolving about its axis, comprising crank arms for carrying the said valve ring.

3. In hydraulic transmission gear of the type specified and as claimed in claim 1, the provision of slots or recesses in the walls of each said pocket at the opposite sides of the roller, such slots or recesses being located to include the line of contact of roller and wall at the ends of the outer and inner strokes of the roller in its pocket and thereby to effect a momentary interconnection between each said pocket and said space.

4. In hydraulic transmission gear of the type specified and as claimed in claim 1, the provision in the said valve ring of by-pass recesses for interconnecting in pairs, the ports leading to the pockets and to the spaces or divisions around the excentric upon which the rollers ride, and of means for preventing the valve ring from revolving about its axis.

5. In hydraulic transmission gear of the type specified in which rollers are constrained to remain in contact with an excentric ring and to reciprocate in radial pockets in a casing concentric with the axis of rotation of the excentric ring, fluid distribution ports leading from each of said pockets and from the spaces or divisions between said rollers, said excentric ring and said casing, together with a valve ring adapted to open and close said ports, the provision of a passageway for fluid leading from one side of a roller to the other side of the same said passageway being blocked at all positions of the roller except that of its maximum throw.

6. In hydraulic transmission gear as claimed in claim 5, the provision of means controlled by the excentric on which the roller is borne to uncover said passageway at the position of the maximum throw of the excentric.

7. In hydraulic transmission gear of the type specified in which rollers are constrained to remain in contact with an excentric ring and to reciprocate in radial pockets in a casing concentric with the axis of rotation of the excentric ring fluid distribution ports leading from each of said pockets and from the spaces or divisions between said rollers, said excentric ring and said casing, together with a valve ring adapted to open and close said ports, the provision in the valve ring of by-pass recesses adapted to interconnect the port leading to each pocket in turn with the port leading to the space at the further side of the roller working in each pocket, the recesses being so positioned and means being provided for control of the positioning of the valve ring relatively to the pockets such that said interconnection is made only at the moment when the roller reciprocating in the said pocket is at the end of its stroke.

8. In hydraulic trasmission gear as claimed in claim 7, the arrangement of said recesses in the valve ring in two sets, one of said sets of recesses operating to interconnect said ports when the casing is rotating in one direction and the other set operating when the casing is rotating in the opposite direction.

9. In hydraulic transmission gear of the type specified in which rollers are constrained to remain in contact with an excentric ring and to reciprocate in radial pockets in a casing concentric with the axis of rotation of the excentric ring, fluid distribution ports leading from each of said pockets and from the spaces or divisions between said rollers, said excentric ring and said casing, together with a valve ring adapted to open and close said ports, the provision of means for the momentary interconnection of fluid at one side of a roller with fluid at the opposite side of the same roller, said means comprising passageways within the valve ring adapted momentarily to interconnect ports leading to opposite sides of a roller at the instant when said roller is at the end of its stroke.

RALPH JOHN SMITH.
CHARLES ANDREW NEWTON.
REGINALD CLAUDE ROE.